(12) United States Patent
Wang et al.

(10) Patent No.: US 9,602,019 B2
(45) Date of Patent: Mar. 21, 2017

(54) VOLTAGE-ADJUSTING DEVICE AND METHOD IN POWER CONVERSION SYSTEM

(71) Applicant: Delta Electronics (Shanghai) Co., Ltd., Shanghai (CN)

(72) Inventors: Zheng Wang, Shanghai (CN); Yi Zhang, Shanghai (CN); Hong-Jian Gan, Shanghai (CN); Jian-Ping Ying, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 59 days.

(21) Appl. No.: 14/709,493

(22) Filed: May 12, 2015

(65) Prior Publication Data

US 2015/0349654 A1 Dec. 3, 2015

(30) Foreign Application Priority Data

May 30, 2014 (CN) .......................... 2014 1 0239310

(51) Int. Cl.
*G05F 1/00* (2006.01)
*H02M 3/335* (2006.01)
(Continued)

(52) U.S. Cl.
CPC ........... *H02M 5/44* (2013.01); *H02M 1/4216* (2013.01); *H02M 5/4585* (2013.01); *Y02B 70/126* (2013.01)

(58) Field of Classification Search
CPC .. G05F 1/44; G05F 1/45; G05F 1/455; H02M 1/081; H02M 1/082; H02M 1/4216;
(Continued)

(56) References Cited

U.S. PATENT DOCUMENTS 4,375,612 A * 3/1983 Wirth .................. H02M 7/1626
318/767
6,757,185 B2 6/2004 Rojas Romero et al.
(Continued)

FOREIGN PATENT DOCUMENTS

CN 102761269 A 10/2012
CN 103023290 A 4/2013
(Continued)

OTHER PUBLICATIONS

Jiang Zhou et al., "Design and Realization of Three-Phase/Level/ Switch (Vienna) Rectifier", China Academic Journal Electronic Publishing House, Jan. 15, 2014, p. 11-15, No. 1.

*Primary Examiner* — Adolf Berhane
*Assistant Examiner* — Gary Nash
(74) *Attorney, Agent, or Firm* — CKC & Partners Co., Ltd.

(57) ABSTRACT

The present disclosure provides a voltage-adjusting device applied in a power conversion system including a Vienna rectifier, a direct current (DC) bus, and an inverter. The voltage-adjusting device includes a grid voltage sampling module for sampling a grid voltage, a given bus voltage calculation module, a voltage-adjusting module, a current control module and a pulse width modulation module. The given bus voltage calculation module calculates a given value of the DC bus voltage based on the grid voltage. The current control module receives a three phase AC current from the grid, the active current given signal and the reactive current given signal to output a three phase control voltage. The pulse width modulation module outputs a pulse control signal to the Vienna rectifier.

24 Claims, 6 Drawing Sheets

(51) Int. Cl.
*H02M 5/44* (2006.01)
*H02M 1/42* (2007.01)
*H02M 5/458* (2006.01)

(58) Field of Classification Search
CPC ........ H02M 1/425; H02M 5/453; H02M 5/45;
H02M 5/458; H02M 5/4585
USPC ..... 323/241, 274, 283, 284, 287; 363/21.12,
363/21.13, 21.17, 21.18
See application file for complete search history.

(56) References Cited

U.S. PATENT DOCUMENTS

| | | | |
|---|---|---|---|
| 7,675,758 B2 | 3/2010 | Artusi et al. | |
| 8,018,747 B2* | 9/2011 | Iwashita | H02M 7/219 363/127 |
| 2002/0154526 A1* | 10/2002 | Sakai | H02M 1/4216 363/132 |
| 2009/0244937 A1* | 10/2009 | Liu | H02M 1/4216 363/46 |
| 2011/0170322 A1* | 7/2011 | Sato | H02J 9/062 363/40 |
| 2012/0032617 A1* | 2/2012 | Jones | B63H 21/17 318/51 |
| 2013/0063070 A1* | 3/2013 | Zhang | H02P 27/14 318/729 |
| 2013/0076293 A1* | 3/2013 | Chen | H02J 3/01 318/729 |
| 2013/0083571 A1* | 4/2013 | Pu | H02M 1/126 363/44 |
| 2013/0094258 A1* | 4/2013 | Royak | H02M 1/32 363/89 |

FOREIGN PATENT DOCUMENTS

| | | |
|---|---|---|
| CN | 103051281 A | 4/2013 |
| CN | 103187887 A | 7/2013 |
| TW | 200620799 | 6/2006 |

* cited by examiner

VOLTAGE-ADJUSTING DEVICE AND METHOD IN POWER CONVERSION SYSTEM

RELATED APPLICATIONS

This application claims priority to China Application Serial Number 201410239310.9, filed May 30, 2014, which is herein incorporated by reference.

BACKGROUND

Field of Invention

The present disclosure relates to a voltage adjusting technology. More particularly, the present disclosure relates to a voltage-adjusting device and a method in a power conversion system.

Description of Related Art

With the requirements of energy conservation and carbon reduction and green environmental protection, variable frequency speed regulation motors have broader and broader applications in industrial systems. In recent years, the demand for high-voltage variable frequency systems has significantly increased, and the performance requirements has become more and more stringent. In a high-voltage variable frequency system, the higher the voltage of a direct current (DC) bus that connects a rectifier and a inverter is, the higher the voltage that switches in the rectifier and the inverter need to sustain and consequently the switches have an increased failure rate. In addition, a lifetime of a DC bus capacitor tends to be shortened. In addition to that, when the motor sustains a higher voltage, the motor winding insulation devices will withstand a bigger challenge. In order to improve the system reliability, the DC bus voltage needs to be ensured to operate at as low a level as possible.

SUMMARY

A voltage-adjusting device applied in a power conversion system is provided. The power conversion system comprises a Vienna rectifier, a DC bus, and an inverter. The Vienna rectifier converts a three-phase AC voltage of a grid to a DC bus voltage. The inverter is electrically coupled to the DC bus and generates a three-phase AC signal based on the DC bus voltage transmitted by the DC bus. The voltage-adjusting device comprises a grid voltage sampling module, a given bus voltage calculating module, a voltage-adjusting module, a current control module, and a pulse width modulation (PWM) module. The grid voltage sampling module is electrically coupled to the grid for sampling a grid voltage. The given bus voltage calculating module calculates a given DC bus voltage based on the grid voltage. The voltage-adjusting module receives a DC bus voltage and the given DC bus voltage and outputs an active current given signal based on the DC bus voltage and the given DC bus voltage. The current control module is electrically coupled to the voltage-adjusting module, which is configured for receiving a three-phase AC current from the grid, the active current given signal and the reactive current given signal to output a three-phase control voltage. The pulse width modulation module receives the three-phase control voltage and the DC bus voltage to output a pulse control signal to the Vienna rectifier.

The disclosure provides a power conversion system. The power conversion system comprises a Vienna rectifier, a DC bus, an inverter, and a voltage-adjusting device. The Vienna rectifier convers a three-phase AC voltage of a grid to a DC bus voltage. The inverter is electrically coupled to the DC bus to generate a three-phase AC signal based on the DC bus voltage transmitted by the DC bus. The voltage-adjusting device comprises a grid voltage sampling module, a given bus voltage calculating module, a voltage-adjusting module, a current control module, and a pulse width modulation module. The grid voltage sampling module is electrically coupled to the grid for sampling a grid voltage. The given bus voltage calculating module calculates a given DC bus voltage based on the grid voltage. The voltage-adjusting module receives a DC bus voltage and the given DC bus voltage and outputs an active current given signal based on the DC bus voltage and the given DC bus voltage. The current control module is electrically coupled to the voltage-adjusting module and for receiving a three-phase AC current from the grid, the active current given signal and a reactive current given signal to output a three-phase control voltage. The pulse width modulation module receives the three-phase control voltage and the DC bus voltage to output a pulse control signal to the Vienna rectifier.

The disclosure further provides a voltage adjusting method applied to a voltage-adjusting device in a power conversion system. The power conversion system comprises a Vienna rectifier, a DC bus, and an inverter. The Vienna rectifier converts a three-phase AC voltage of a grid to a DC bus voltage. The inverter is electrically coupled to the DC bus and generates a three-phase AC signal based on the DC bus voltage transmitted by the DC bus. The voltage adjusting method comprises: sampling a grid voltage by a grid voltage sampling module electrically coupled to the grid; calculating a given DC bus voltage based the grid voltage by a given bus voltage calculation module; receiving a DC bus voltage and the given DC bus voltage and outputting an active current given signal based on the DC bus voltage and the given DC bus voltage by a voltage-adjusting module; receiving a three-phase AC current from the grid, the active current given signal and the reactive current given signal and outputting a three-phase control voltage by a current control module electrically coupled to the voltage-adjusting module; and receiving the three-phase control voltage and the DC bus voltage and outputting a pulse control signal to the Vienna rectifier by a pulse width modulation module.

Based on the above, the present disclosure may limit the DC bus voltage within a stable range so as to reduce the stress on system hardware that is caused by a too high DC bus voltage by designing a voltage-adjusting device in the power conversion system. In the empty load or light load operation, the DC bus voltage is prevented from generating a high voltage level due to instant disturbance by using a voltage limiting control method.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
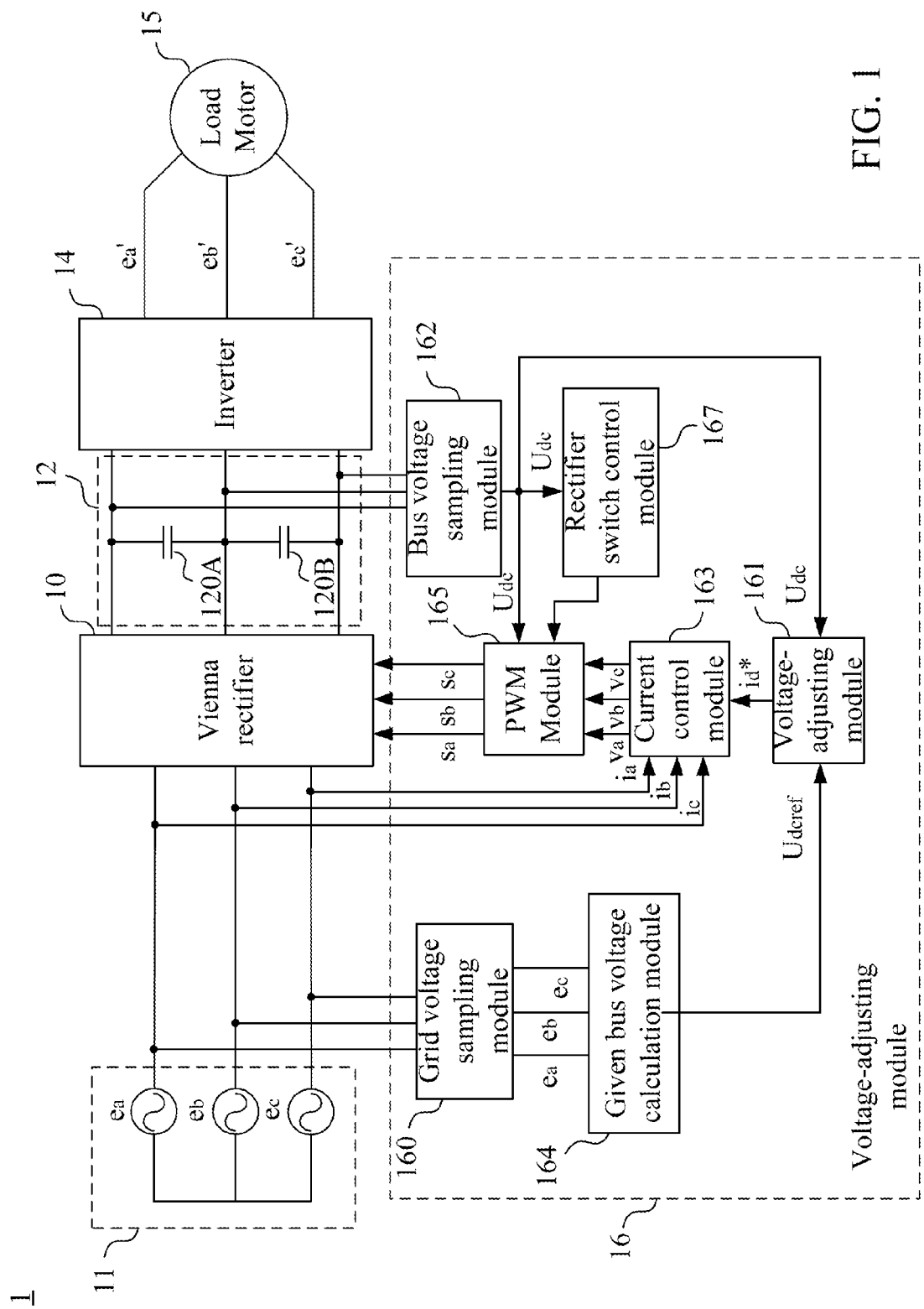
FIG. 1 is a block diagram of a power conversion system according to one embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram of a power conversion system 1 according to one embodiment of this disclosure. The power conversion system 1 comprises a Vienna rectifier 10, a DC bus 12, an inverter 14, and a voltage-adjusting device 16.

In one embodiment, the Vienna rectifier 10 comprises a plurality of switches (not shown in the figure), such as but not limited to an insulated gate bipolar transistor (IGBT). Three-phase alternating current (AC) voltages $e_a$, $e_b$, and $e_c$ of a grid 11 are converted to a DC bus voltage $U_{dc}$ by turning on and turning off of the switches.

The DC bus 12 transmits the DC bus voltage $U_{dc}$. In one embodiment, the power conversion system 1 may comprise DC bus capacitors 120A and 120B electrically coupled to the DC bus 12, and these DC bus capacitors are used to support and filter the DC bus voltage $U_{dc}$.

The inverter 14 is electrically coupled to the Vienna rectifier 10 via the DC bus 12 for generating three-phase AC signals $e'_a$, $e'_b$, and $e'_c$ based on the DC bus voltage $U_{dc}$ transmitted by the DC bus 12. In one embodiment, the inverter 14 is further electrically coupled to a load motor 15 for driving the load motor 15 by the three-phase AC signals $e'_a$, $e'_b$, and $e'_c$.

The voltage-adjusting device 16 comprises: a grid voltage sampling module 160, a bus voltage sampling module 162, a given bus voltage calculation module 164, a voltage-adjusting module 161, a current control module 163, and a pulse width modulation (PWM) module 165.

The grid voltage sampling module 160 is electrically coupled to the grid 11 for sampling a grid voltage. The bus voltage sampling module 162 is electrically coupled to the DC bus 12 for sampling a numerical value the DC bus voltage $U_{dc}$.

The given bus voltage calculation module 164 calculates a given DC bus voltage $U_{dcref}$ based on a peak value of grid line voltage. In one embodiment, the given bus voltage calculation module 164 further calculates a given range of the DC bus voltage based on an effective value of a grid rated voltage $U_{ACn}$ of the grid 11. The given range of the DC bus voltage comprises an upper range value $U_{dcref\,max}$ and a lower range value $U_{dcref\,min}$.

In one embodiment, the lower the DC bus voltage $U_{dc}$ is, the lower the voltage that the Vienna rectifier 10 and the inverter 14 need to sustain. However, in order to maintain the normal operation of the Vienna rectifier 10, the DC bus voltage $U_{dc}$ must be greater than a peak value of grid line voltage. Then, voltage stress, current harmonic, and current regulation capability are taken into account. The given DC bus voltage $U_{dcref}$ may be set to be k times the peak value of grid line voltage. In one embodiment, a value range of the coefficient k may be between 1.0 and 1.2.

In one embodiment, the upper range value $U_{dcref\,max}$ of the given range of the DC bus voltage must at least be greater than $\sqrt{2}U_{ACN} \times 1.1$ since the system still needs to operate steadily when the grid voltage reaches 110% of the effective value of the grid rated voltage $U_{ACN}$. In other words, the upper range value $U_{dcref\,max}$ of the given range of the DC bus voltage can be represented by the following formula:

$$U_{dcref\,max} \geq \sqrt{2}U_{ACN} \times 1.1$$

In addition, in one embodiment, the lower range value $U_{dcref\,min}$ of the given range of the DC bus voltage must at least be equal to $\sqrt{2}U_{ACN}$ when considering the capability of the inverter 14 for outputting a rated output voltage. In other words, the lower range value $U_{dcref\,min}$ of the given range of the DC bus voltage can be represented by the following formula:

$$U_{dcref\,min} \geq \sqrt{2}U_{ACN}$$

Therefore, the upper range value $U_{dcref\,max}$ and the lower range value $U_{dcref\,min}$ of the given range of the DC bus voltage can be respectively determined based on the percentage of the effective value of the grid rated voltage $U_{ACN}$ that the grid voltage reaches up to which the system still needs to operate steadily and the capability of the inverter 14 for outputting the rated output voltage.

In one embodiment, the relationships between a value range of the given DC bus voltage $U_{deref}$ and the upper range value $U_{dcref\,max}$ and the lower range value $U_{dcref\,min}$ of the given range of the DC bus voltage can be represented by the following two formulae:

$$\begin{cases} U_{dcref} = \sqrt{2}\,U_{AC} \times k \\ U_{dcref\,min} \leq U_{dcref} \leq U_{dcref\,max} \end{cases}$$

When the calculated given DC bus voltage $U_{dcref}$ is not within the range defined by the upper range value $U_{dcref\,max}$ and the lower range value $U_{dcref\,min}$ of the given range of the DC bus voltage, the given DC bus voltage $U_{dcref}$ will be limited between the upper range value $U_{dcref\,max}$ and the lower range value $U_{dcref\,min}$ of the given range of the DC bus voltage.

In the above embodiment, $\sqrt{2}$ is a value taken and retained to allow the system to buffer, and may be adjusted to different numerical values depending on practical situations in other embodiments and is not limited to the above example. Additionally, in other embodiments, the percentage of the effective value of the grid rated voltage $U_{ACN}$ that the grid voltage reaches up to which the system still needs to maintain normal operation may be adjusted to different numerical values depending on practical situations and is not limited to the above example.

The voltage-adjusting module 161 generates an active current given signal $i_d^*$ based on the DC bus voltage $U_{dc}$, and the above calculated given DC bus voltage $U_{dcref}$ and given range of the DC bus voltage. The current control module 163 outputs three-phase control voltages $V_a$, $V_b$, and $V_c$ based on sampled current values $i_a$, $i_b$, and $i_c$ of the grid 11, the active current given signal $i_d^*$ and a reactive current given signal. In general, if the power factor of the system is required to be 1, the reactive current given signal should be 0. If a better control mechanism over the low-order harmonic under the structure of the Vienna rectifiers is required, it is better to assign a non-zero value to the reactive current given signal to accomplish the compensation mechanism.

The pulse width modulation module 165 further generates pulse control signals $S_a$, $S_b$, and $S_c$ to the switches of the Vienna rectifier 10 based on the three-phase control voltages $V_a$, $V_b$, and $V_c$ for controlling the operation of the Vienna rectifier 10. The DC bus voltage $U_{dc}$ is thus controlled to track the given DC bus voltage $U_{dcref}$. As mentioned previously, the given DC bus voltage $U_{dcref}$ is limited between the upper range value $U_{dcref\_max}$ and the lower range value $U_{deref\_min}$ of the given range of the DC bus voltage.

Hence, in the present disclosure power conversion system 1, the voltage-adjusting device 16 can limit the DC bus voltage $U_{dc}$ within a stable range for reducing the stress on the system hardware caused by an over-high DC bus voltage $U_{dc}$. The lifetime of system hardware is lengthened to avoid the hazard caused by damage when the system hardware is affected by the high voltage.

In one embodiment, the voltage-adjusting device 16 further comprises a rectifier switch control module 167. The rectifier switch control module 167 receives the DC bus voltage $U_{dc}$ for comparing with a voltage threshold $U_{dc\_highlimit}$ (not shown in the figure). The rectifier switch control module 167 controls the pulse width modulation module 165 to directly turn off the switches of the Vienna rectifier 10 if the DC bus voltage $U_{dc}$ is greater than the voltage threshold $U_{dc\_highlimit}$. The rectifier switch control module 167 also stops controlling the pulse width modulation module 165 if the DC bus voltage $U_{dc}$ is less than the voltage threshold $U_{dc\_highlimit}$. The voltage threshold obtained from the given DC bus voltage $U_{dcref}$ multiplied by a limiting coefficient $k_{limit}$. Wherein the relationship between the limiting coefficient $k_{limit}$ and a bus voltage protection coefficient $k_{limit\_max}$ is:

$$1 < k_{limit} < k_{limit\_max}$$

Since the energy of the Vienna rectifier 10 can only flow in a single direction, the Vienna rectifier 10 cannot operate normally in the empty load like a four-quadrant converter does. In order to ensure that the DC bus voltage $U_{dc}$ does not lead to the overvoltage situation when the Vienna rectifier 10 works in the empty load or light load operation, the rectifier switch control module 167 can control the pulse width modulation module 165 to stop transmitting the pulse control signals $S_a$, $S_b$, and $S_c$ to the switches of the Vienna rectifier 10 before the Vienna rectifier 10 becomes overvoltage. As a result, the energy accumulation in the DC bus capacitors 120A and 120B is prevented.

Figure 2:
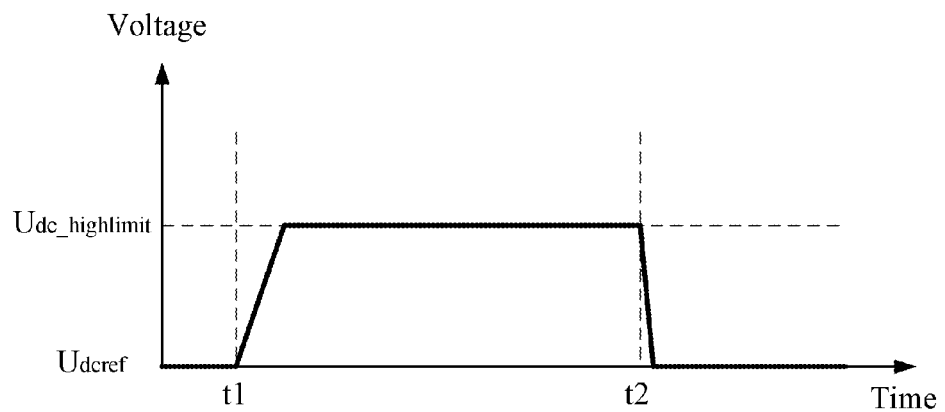
FIG. 2 is a voltage waveform of a DC bus voltage according to one embodiment of this disclosure.

FIG. 2 is a voltage waveform of a DC bus voltage $U_{dc}$ according to one embodiment of this disclosure. Wherein the horizontal axis represents time t, the vertical axis represents the DC bus voltage $U_{dc}$.

As shown in FIG. 2, before time t1, the inverter 14 is in loaded operation state and keeps consuming energy. The Vienna rectifier 10 can control the DC bus voltage $U_{dc}$ at a value around the given DC bus voltage $U_{dcref}$ through the control of the voltage-adjusting module 161, the current control module 163, and the pulse width modulation module 165.

At time t1, the inverter 14 starts to become in light load operation, or even in empty load operation without consuming any energy. At this time, the Vienna rectifier 10 cannot be controlled by the voltage-adjusting module 161, the current control module 163, and the pulse width modulation module 165, and the DC bus voltage $U_{dc}$ continues to increase. The rectifier switch control module 167 thus determines that the DC bus voltage $U_{dc}$ is greater than the voltage threshold $U_{dc\_highlimit}$.

Hence, the rectifier switch control module 167 can control the pulse width modulation module 165 to stop transmitting the pulse control signals $S_a$, $S_b$, and $S_c$ to the switches of the Vienna rectifier 10 at this time. The DC bus voltage $U_{dc}$ will be limited to the voltage threshold $U_{dc\_highlimit}$ and does not increase continuously.

At time t2, the inverter 14 switches to be in loaded operation state again and consumes energy. The DC bus voltage $U_{dc}$ thus decreases. Hence, the rectifier switch control module 167 can stop controlling the pulse width modulation module 165 at this time. The Vienna rectifier 10 is under the control of the voltage-adjusting module 161, the current control module 163, and the pulse width modulation module 165 again.

In another embodiment, in order to ensure that the above mechanism is not easily triggered when the inverter 14 is in loaded operation state and the DC bus voltage $U_{dc}$ is not keep at a too high numerical value when the inverter 14 is in light load or empty load operation, the rectifier switch control module 167 adopts the different voltage thresholds $U_{dc\_highlimit}$ depending on situations.

Figure 3:
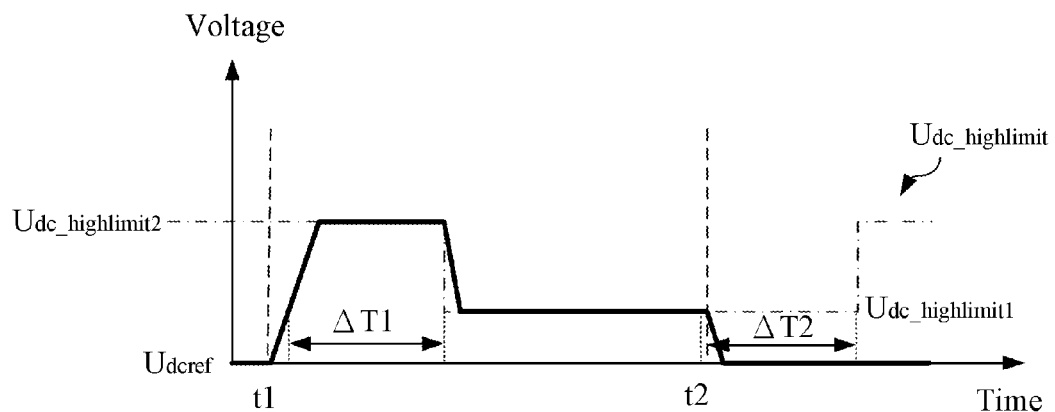
FIG. 3 is a voltage waveform of a DC bus voltage according to another embodiment of this disclosure.

FIG. 3 is a voltage waveform of a DC bus voltage $U_{dc}$ according to another embodiment of this disclosure. Wherein the horizontal axis represents time t, the vertical axis represents the DC bus voltage $U_{dc}$.

In the present embodiment, the rectifier switch control module 167 adopts a first voltage threshold $U_{dc\_highlimit1}$ or a second voltage threshold $U_{dc\_highlimit}$ depending on different situations, in which the second voltage threshold $U_{dc\_highlimit2}$ is higher than the first voltage threshold $U_{dc\_highlimit1}$.

As shown in FIG. 3, before time t1, an initial value of the voltage threshold $U_{dc\_highlimit}$ is the second voltage threshold $U_{dc\_highlimit2}$. The inverter 14 is in loaded operation state. The Vienna rectifier 10 can control the DC bus voltage $U_{dc}$ at a value around the given DC bus voltage $U_{dcref}$ through the control of the voltage-adjusting module 161, the current control module 163, and the pulse width modulation module 165.

At time t1, the inverter 14 starts to become in light-load operation state, or even in empty load operation without consuming any energy. At this time, the Vienna rectifier 10 cannot control the DC bus voltage $U_{dc}$ through the voltage-adjusting module 161, the current control module 163, and the pulse width modulation module 165. The DC bus voltage $U_{dc}$ continues to increase. The rectifier switch control module 167 thus determines that the DC bus voltage $U_{dc}$ is greater than the second voltage threshold $U_{dc\_highlimit2}$.

Hence, the rectifier switch control module 167 can control the pulse width modulation module 165 to stop transmitting the pulse control signals $S_a$, $S_b$, and $S_c$ to the switches of the Vienna rectifier 10 at this time. The DC bus voltage $U_{dc}$ will be limited to the second voltage threshold $U_{dc\_highlimit2}$ and does not increase continuously. At the same time, the rectifier switch control module 167 will determine when the duration that the DC bus voltage $U_{dc}$ is greater than the first voltage threshold $U_{dc\_highlimit1}$ longer than a first time interval $\Delta T1$.

When the duration that the DC bus voltage $U_{dc}$ is greater than the first voltage threshold $U_{dc\_highlimit1}$ is longer than the first time interval $\Delta T1$, the rectifier switch control module 167 sets the voltage threshold $U_{dc\_highlimit}$ to be the first voltage threshold $U_{dc\_highhmit1}$. Hence, the DC bus voltage $U_{dc}$ will be limited to the lower first voltage threshold $U_{dc\_highlimit1}$ and does not increase anymore.

At time t2, the inverter 14 changes to be in loaded operation state again and consumes energy. The DC bus voltage $U_{dc}$ thus decreases. Hence, the rectifier switch control module 167 can stop controlling the pulse width modulation module 165 at this time. The Vienna rectifier 10 is under the control of the voltage-adjusting module 161, the current control module 163, and the pulse width modulation module 165 again. At the same time, the rectifier switch control module 167 will determine when the duration that the DC bus voltage $U_{dc}$ is less than or equal to the first voltage threshold $U_{dc\_highlimit1}$ longer than a second time interval $\Delta T2$.

When the duration that the DC bus voltage $U_{dc}$ is less than the first voltage threshold $U_{dc\_highlimit1}$ is longer than the second time interval $\Delta T2$, the rectifier switch control module 167 sets the voltage threshold $U_{dc\_highlimit}$ to be the higher second voltage threshold $U_{dc\_highlimit2}$. Thus, the overvoltage protection mechanism for the rectifier switch control module 167 will not be triggered again until the DC bus voltage $U_{dc}$ is greater than the second voltage threshold $U_{dc\_highlimit2}$.

In one embodiment, the above first voltage threshold $U_{dc\_highlimit1}$ and second voltage threshold $U_{dc\_highlimit2}$ may be respectively set to be obtained from the given DC bus voltage $U_{dcref}$ multiplied by a first limiting coefficient $k_{limit1}$ and a second limiting coefficient $k_{limit2}$. For example, the first voltage threshold $U_{dc\_highlimit1}$ and the second voltage threshold $U_{dc\_highlimit2}$ can be represented by the following two formulae:

$$U_{dc\_highlimit1} = U_{dcref} k_{limit1}$$

$$U_{dc\_highlimit2} = U_{dcref} k_{limit2}$$

In addition, the first voltage threshold $U_{dc\_highlimit1}$ and the second voltage threshold $U_{dc\_highlimit2}$ must be smaller than the given DC bus voltage $U_{dcref}$ multiplied by a bus voltage protection coefficient $k_{limit\_max}$. That is, the relationships between positive multiples corresponding to the first voltage threshold $U_{dc\_highlimit1}$ and the second voltage threshold $U_{dc\_highlimit2}$ and the bus voltage protection coefficient $k_{limit\_max}$ is:

$$1 < k_{limit1} < k_{limit2} < k_{limit\_max}$$

In another embodiment, the above first voltage threshold $U_{dc\_highlimit1}$ and second voltage threshold $U_{dc\_highlimit2}$ can be respectively determined based on an output active power $P_{out}$ of the inverter 14.

According to the present embodiment, the rectifier switch control module 167 will determine whether the duration that the output active power $P_{out}$ of the inverter 14 is less than a power threshold value $P_{load1}$ is longer than the first time interval $\Delta T1$ shown in FIG. 3. When the duration that the output active power $P_{out}$ is less than the power threshold value $P_{load1}$ is longer than the first time interval $\Delta T1$, the rectifier switch control module 167 sets the voltage threshold $U_{dc\_highlimit}$ to be the first voltage threshold $U_{dc\_highlimit1}$. The rectifier switch control module 167 further determines whether the duration that the output active power $P_{out}$ is greater than or equal to the power threshold value is longer than the second time interval $\Delta T2$. When the duration that the $P_{load1}$ output active power $P_{out}$ is greater than or equal to the power threshold value $P_{load1}$ is longer than the second time interval $\Delta T2$, the rectifier switch control module 167 sets the voltage threshold $U_{dc\_highlimit}$ to be the second voltage threshold $U_{dc\_highlimit2}$, which is higher than the first voltage threshold $U_{dc\_highlimit1}$.

Therefore, in the present disclosure power conversion system 1, the voltage-adjusting device 16 can prevent the DC bus voltage $U_{dc}$ from generating a high voltage level due to instant disturbance when the inverter 14 is in the light load or empty load operation by using a voltage limiting control method. The stress on system hardware that is caused by a too high DC bus voltage $U_{dc}$ is thus reduced. The lifetime of system hardware is lengthened to avoid the hazard caused by damage when the system hardware is impacted by high voltage.

Figure 4:
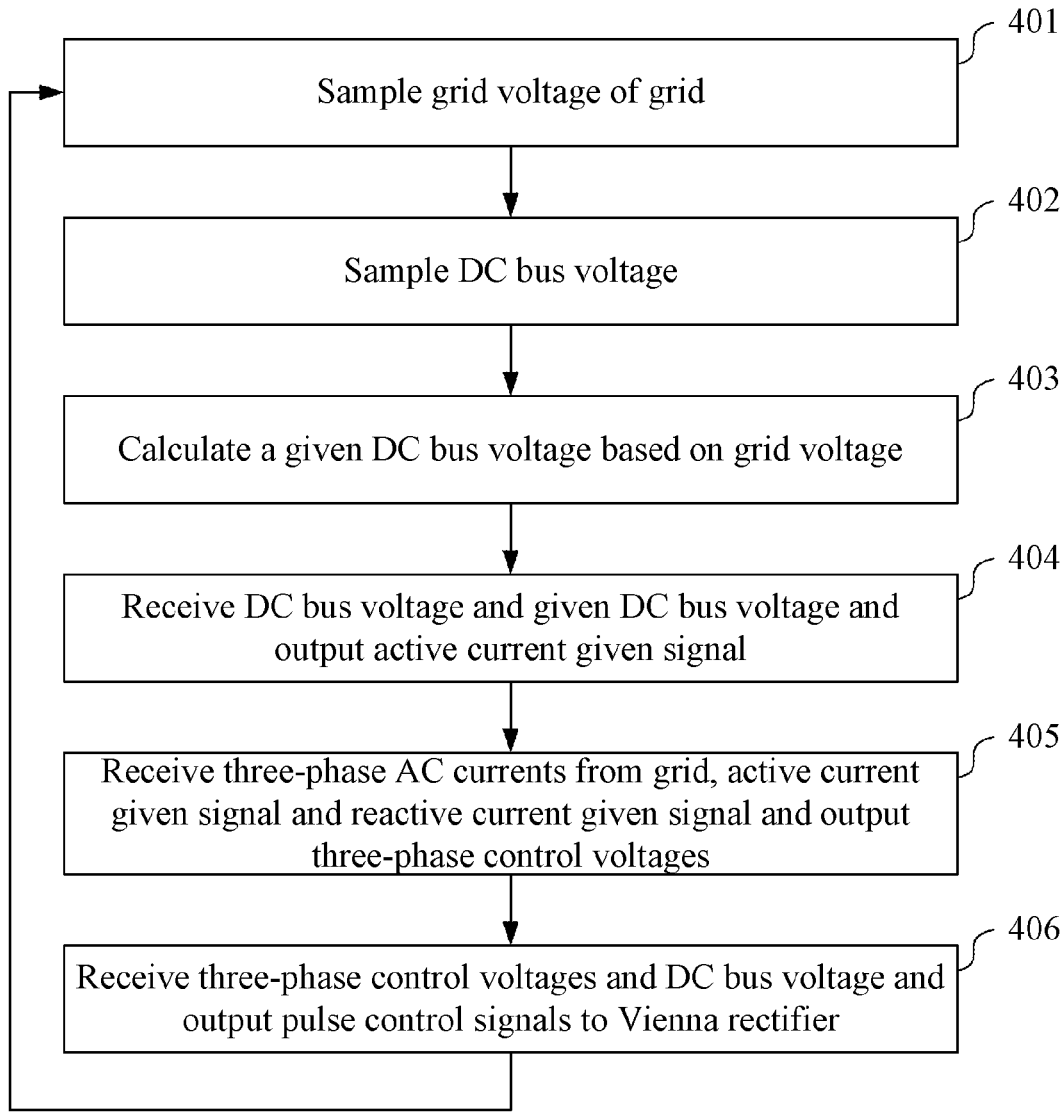
FIG. 4 is a flowchart of a voltage adjusting method according to one embodiment of this disclosure.

FIG. 4 is a flowchart of a voltage adjusting method 400 according to one embodiment of this disclosure. The voltage adjusting method 400 may be applied to the voltage-adjusting device 16 in the power conversion system 1 as shown in FIG. 1. The voltage adjusting method 400 comprises the following steps.

In step 401, a grid voltage is sampled by the grid voltage sampling module 160 electrically coupled to the grid 11.

In step 402, a numerical value of a DC bus voltage $U_{dc}$ is sampled by the bus voltage sampling module 162 electrically coupled to the DC bus 12.

In step 403, a given DC bus voltage $U_{dcref}$ is calculated based the grid voltage by the given bus voltage calculation module 164.

In step 404, the DC bus voltage $U_{dc}$ and the given DC bus voltage $U_{dcref}$ are received to generate an active current given signal $I_d^*$ by the voltage-adjusting module 161.

In step 405, three-phase AC currents from the grid 11 and the active current given signal ($i_d^*$) and a reactive current given signal are received for outputting three-phase control voltages Va, Vb, and Vc by the current control module 163 electrically coupled to the voltage-adjusting module 161.

In step 406, the three-phase control voltages $V_a$, $V_b$, and $V_c$ and the DC bus voltage $U_{dc}$ are received for outputting pulse control signals $S_a$, $S_b$, and $S_c$ to the Vienna rectifier 10 by the pulse width modulation module 165.

Then, the process returns to step 401 re-sampling relevant voltage values.

Figure 5:
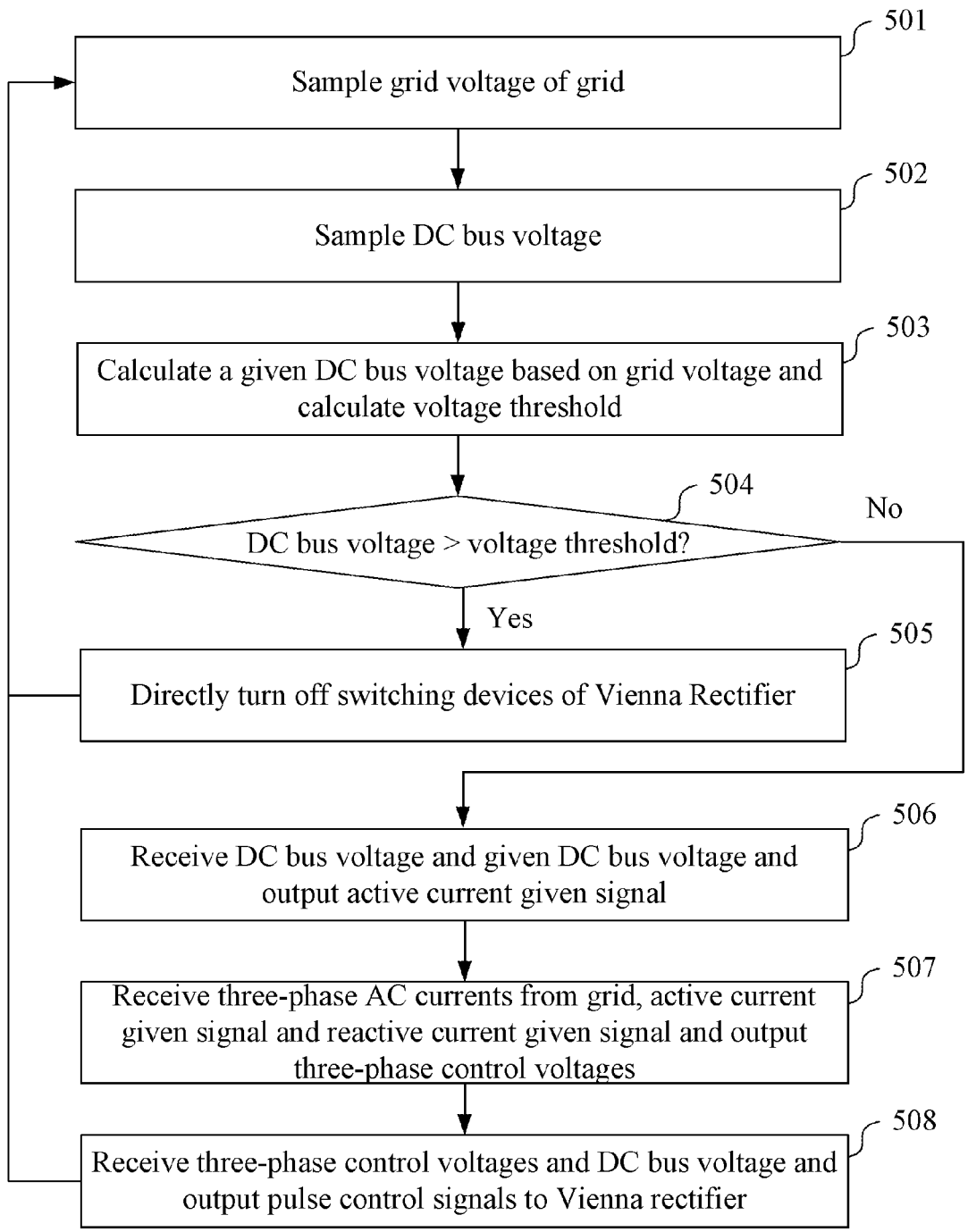
FIG. 5 is a flowchart of a voltage adjusting method according to another embodiment of this disclosure.

FIG. 5 is a flowchart of a voltage adjusting method 500 according to another embodiment of this disclosure. The voltage adjusting method 500 may be applied to the voltage-adjusting device 16 in the power conversion system 1 as shown in FIG. 1. The voltage adjusting method 500 comprises the following steps.

In step 501, a grid voltage is sampled, that is, numerical values of three-phase AC voltages $e_a$, $e_b$, and $e_c$, by the grid voltage sampling module 160 electrically coupled to the grid 11.

In step 502, a numerical value of a DC bus voltage $U_{dc}$ is sampled by the bus voltage sampling module 162 electrically coupled to the DC bus 12.

In step 503, the given bus voltage calculation module 164 calculates a given DC bus voltage $U_{dcref}$ and calculate a voltage threshold $U_{dc\_highlimit}$, wherein the voltage threshold $U_{dc\_highlimit}$ is obtained from the given DC bus voltage $U_{dcref}$ multiplied by a limiting coefficient $k_{limit}$.

In step 504, the rectifier switch control module 167 receives the DC bus voltage $U_{dc}$ for comparing with the voltage threshold $U_{dc\_highlimit}$ and determine whether the DC bus voltage $U_{dc}$ is greater than the voltage threshold $U_{dc\_highlimit}$.

If the DC bus voltage $U_{dc}$ is greater than the voltage threshold $U_{dc\_highlimit}$, the rectifier switch control module 167 controls the pulse width modulation module 165 to directly turn off switches of the Vienna rectifier 10 in step 505. In addition, the process returns to step 501 for sampling voltages continually.

If the DC bus voltage $U_{dc}$ is not greater than the voltage threshold $U_{dc\_highlimit}$ the rectifier switch control module 167 does not control the pulse width modulation module 165. The process proceeds to steps 506-508. Since steps 506-508 are the same as steps 404-406 in FIG. 4, the detail of these steps are not further discussed herein. After step 508, the process returns to step 501 for re-sampling relevant voltage values.

Figure 6:
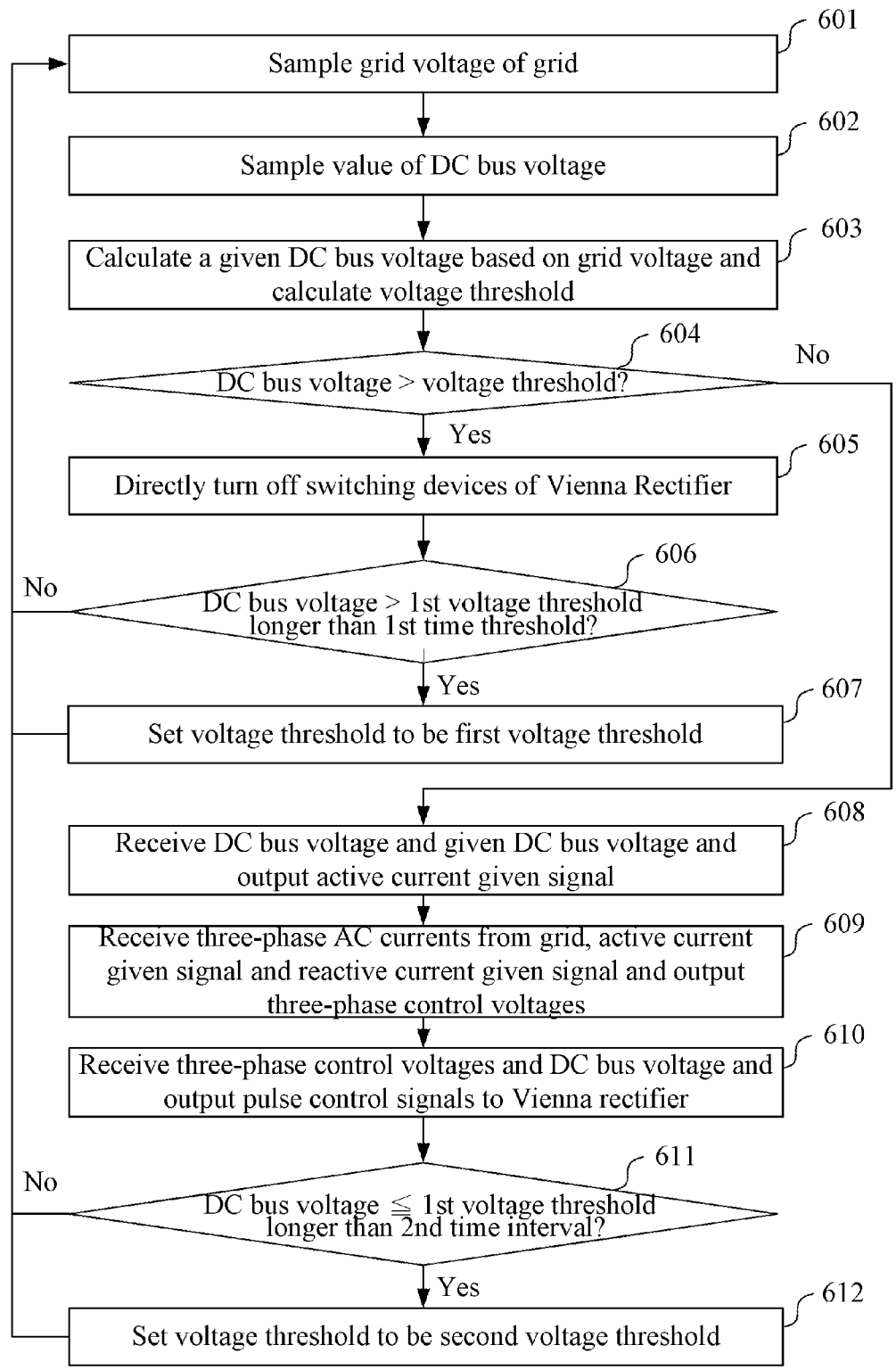
FIG. 6 is a flowchart of a voltage adjusting method according to still another embodiment of this disclosure.

FIG. 6 is a flowchart of a voltage adjusting method 600 according to still another embodiment of this disclosure. The voltage adjusting method 600 may be applied to the voltage-adjusting device 16 in the power conversion system 1 as shown in FIG. 1. The voltage adjusting method 500 comprises the following steps.

Since steps 601-602 in the voltage adjusting method 600 are the same as steps 501-502 in FIG. 5, the detail of these steps are not further discussed herein. In step 603, the given bus voltage calculation module 164 calculates a given DC bus voltage $U_{dcref}$ and calculates a voltage threshold $U_{dc\_highlimit}$. In one embodiment, the given bus voltage calculation module 164 calculates a first voltage threshold $U_{dc\_highlimit1}$ and a second voltage threshold $U_{dc\_highlimit2}$ and sets the second voltage threshold $U_{dc\_highlimit2}$ to be a default voltage threshold $U_{dc\_highlimit}$.

In step 604, the rectifier switch control module 167 receives the DC bus voltage $U_{dc}$ for comparing with the voltage threshold $U_{dc\_highlimit}$ and determine whether the DC bus voltage $U_{dc}$ is greater than the voltage threshold $U_{dc\_highlimit}$.

If the DC bus voltage $U_{dc}$ is greater than the second voltage threshold $U_{dc\_highlimit2}$, the rectifier switch control module 167 controls the pulse width modulation module 165 to directly turn off switches of the Vienna rectifier 10 in step 605.

Then, the rectifier switch control module 167 further determines whether the duration that the DC bus voltage Udc is greater than the first voltage threshold $U_{dc\_highlimit1}$ is longer than a first time interval ΔT1 in step 606. When the duration that the DC bus voltage $U_{dc}$ is greater than the first voltage threshold $U_{dc\_highlimit1}$ is longer than the first time interval ΔT1, the rectifier switch control module 167 sets the voltage threshold $U_{dc\_highlimit}$ to be the first voltage threshold $U_{dc\_highlimit1}$ in step 607.

If it is determined that the duration that the DC bus voltage $U_{dc}$ is greater than the first voltage threshold $U_{dc\_highlimit1}$ is not longer than the first time interval ΔT1 in step 606, or if step 607 is finished, the process returns to step 601 for re-sampling relevant voltage values.

In addition, if the DC bus voltage $U_{dc}$ is not greater than the second voltage threshold $U_{dc\_highlimit2}$, the process proceeds to steps 608-610. Since steps 608-610 are the same as steps 506-508 in FIG. 5, the detail of these steps are not further discussed herein. In the present embodiment, the rectifier switch control module 167 further determines when the duration that the DC bus voltage Udc is less than or equal to the first voltage threshold $U_{dc\_highlimit1}$ longer than a second time interval ΔT2 in step 611.

When the duration that the DC bus voltage $U_{dc}$ is less than or equal to the first voltage threshold $U_{dc\_highlimit1}$ is longer than the second time interval ΔT2, the rectifier switch control module 167 sets the voltage threshold $U_{dc\_highlimit}$ to be the second voltage threshold $U_{dc\_highlimit2}$ in step 612. The process returns to step 601 for re-sampling relevant voltage values.

Figure 7:
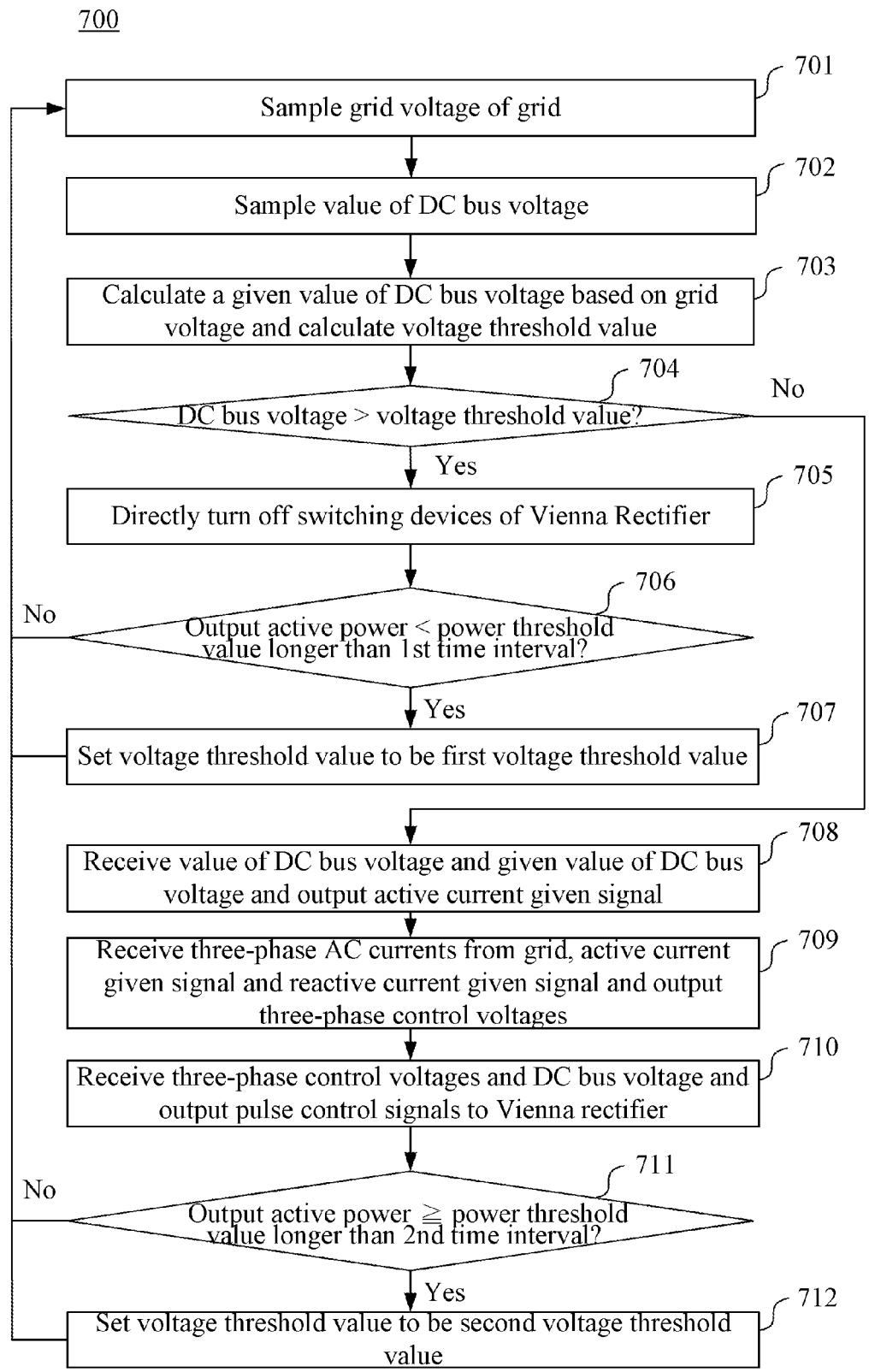
FIG. 7 is a flowchart of a voltage adjusting method according to yet another embodiment of this disclosure.

FIG. 7 is a flowchart of a voltage adjusting method 700 according to yet another embodiment of this disclosure. The voltage adjusting method 700 may be applied to the voltage-adjusting device 16 in the power conversion system 1 as shown in FIG. 1. The voltage adjusting method 700 comprises the following steps.

Since steps 701-705, steps 707-710, and step 712 in the voltage adjusting method 700 are the same as steps 601-605, steps 607-610, and step 612 in FIG. 6, the detail of these steps are not further discussed herein. However, in the present embodiment, in step 706 and step 711, whether a voltage threshold $U_{dc\_highlimit}$ is set to be a first voltage threshold $U_{dc\_highlimit1}$ or a second voltage threshold $U_{dc\_highlimit2}$ is respectively determined based on whether the duration that an output active power of the inverter 14 is less than a power threshold value is longer than a first time interval ΔT1 and whether the duration that the output active power of the inverter 14 is greater than or equal to the power threshold value is longer than a second time interval ΔT2. Therefore, the voltage adjusting method 700 may achieve the mechanism of dynamically adjusting the voltage threshold $U_{dc\_highlimit}$ same as that achieved by the voltage adjusting method 600 in FIG. 6 by judging the magnitude of the output active power of the inverter 14.

Although the present disclosure is described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A voltage-adjusting device applied in a power conversion system, the power conversion system comprising a Vienna rectifier, a DC bus, and an inverter, the Vienna rectifier converting a three-phase AC voltage of a grid to a DC bus voltage, the inverter being electrically coupled to the DC bus and generating a three-phase AC signal based on the DC bus voltage transmitted by the DC bus, the voltage-adjusting device comprising:
   a grid voltage sampling module, electrically coupled to the grid, for sampling a grid voltage;
   a given bus voltage calculating module for calculating a given DC bus voltage based on the grid voltage;
   a voltage-adjusting module for receiving the DC bus voltage and the given DC bus voltage, and outputting an active current given signal based on the DC bus voltage and the given DC bus voltage;
   a current control module electrically coupled to the voltage-adjusting module, which is configured for receiving a three-phase AC current from the grid, the active current given signal and the reactive current given signal to output a three-phase control voltage;
   a pulse width modulation (PWM) module for receiving the three-phase control voltage and the DC bus voltage to output a pulse control signal to the Vienna rectifier; and
   a rectifier switch control module for receiving the DC bus voltage and comparing it with a DC bus voltage threshold, and outputting a switch control signal according to a comparison result, wherein the pulse width modulation module outputs the pulse control signal based on the three-phase control voltage, the DC bus voltage and the switch control signal.

2. The voltage-adjusting device of claim 1, wherein the given DC bus voltage is k times a peak value of grid line voltage, and k is between 1.0 and 1.2.

3. The voltage-adjusting device of claim 1, further comprising:
a bus voltage sampling module electrically coupled to the DC bus, for sampling the DC bus voltage.

4. The voltage-adjusting device of claim 1, wherein the DC bus voltage threshold is a first voltage threshold when the voltage-adjusting device works in empty load or light load operation, and the DC bus voltage threshold is a second voltage threshold when the voltage-adjusting device is in overload operation, wherein the first voltage threshold is smaller than the second voltage threshold.

5. The voltage-adjusting device of claim 4, wherein the first voltage threshold is obtained from the given DC bus voltage multiplied by a first limiting coefficient $k_{limit1}$, the second voltage threshold is obtained from the given DC bus voltage multiplied by a second limiting coefficient $k_{limit2}$, wherein a value range of $k_{limit1}$ and $k_{limit2}$ is $1 < k_{limit1} < k_{limit2} < k_{limitmax}$, where $k_{limitmax}$ is a bus voltage protection coefficient corresponding to an overvoltage protection value of the DC bus voltage.

6. The voltage-adjusting device of claim 4, wherein the rectifier switch control module further determines when the duration that the DC bus voltage is greater than the first voltage threshold is longer than a first time interval, the DC bus voltage threshold is set to be the first voltage threshold; and
determines when the duration that the DC bus voltage is less than the first voltage threshold is longer than a second time interval, the DC bus voltage threshold is set to be the second voltage threshold, which is higher than the first voltage threshold.

7. The voltage-adjusting device of claim 4, wherein the rectifier switch control module further determines when the duration that an output active power of the inverter is less than a power threshold value is longer than a first time interval, the DC bus voltage threshold is set to be the first voltage threshold; and
determines when the duration that the output active power is greater than or equal to the power threshold value is longer than a second time interval, the DC bus voltage threshold is set to be the second voltage threshold, which is higher than the first voltage threshold.

8. The voltage-adjusting device of claim 1, wherein the DC bus voltage threshold is obtained from the given DC bus voltage multiplied by a limiting coefficient $k_{limit}$, wherein a value range of $k_{limit}$ is $1 < k_{limit} < k_{limitmax}$, where $k_{limitmax}$ is a bus voltage protection coefficient corresponding to an overvoltage protection value of the DC bus voltage.

9. A power conversion system comprising:
a Vienna rectifier for converting a three-phase AC voltage of a grid to a DC bus voltage;
a DC bus;
an inverter electrically coupled to the DC bus, for generating a three-phase AC signal based on the DC bus voltage; and
a voltage-adjusting device comprising:
a grid voltage sampling module, electrically coupled to the grid, for sampling a grid voltage;
a given bus voltage calculating module for calculating a given DC bus voltage based on the grid voltage;
a voltage-adjusting module for receiving the DC bus voltage and the given DC bus voltage, and outputting an active current given signal based on the DC bus voltage and the given DC bus voltage;
a current control module electrically coupled to the voltage-adjusting module, which is configured for receiving a three-phase AC current from the grid, the active current given signal and the reactive current given signal to output a three-phase control voltage;
a pulse width modulation module for receiving the three-phase control voltage and the DC bus voltage to output a pulse control signal to the Vienna rectifier; and
a rectifier switch control module for receiving the DC bus voltage and comparing it with a DC bus voltage threshold, and outputting a switch control signal according to a comparison result, wherein the pulse width modulation module outputs the pulse control signal based on the three-phase control voltage, the DC bus voltage and switch control signal.

10. The power conversion system of claim 9, wherein the given DC bus voltage is k times a peak value of grid line voltage, and k is between 1.0 and 1.2.

11. The power conversion system of claim 9, wherein the voltage-adjusting device further comprises:
a bus voltage sampling module electrically coupled to the DC bus, for sampling the DC bus voltage.

12. The power conversion system of claim 9, wherein the DC bus voltage threshold is a first voltage threshold when the voltage-adjusting device works in empty load or light load operation, and the DC bus voltage threshold is a second voltage threshold when the voltage-adjusting device is in overload operation, wherein the first voltage threshold is smaller than the second voltage threshold.

13. The power conversion system of claim 12, wherein the first voltage threshold is obtained from the given DC bus voltage multiplied by a first limiting coefficient $k_{limit1}$, the second voltage threshold is obtained from the given DC bus voltage multiplied by a second limiting coefficient $k_{limit2}$, wherein a value range of $k_{limit1}$ and $k_{limit2}$ is $1 < k_{limit1} < k_{limit2} < k_{limitmax}$, where $k_{limitmax}$ is a bus voltage protection coefficient corresponding to an overvoltage protection value of the DC bus voltage.

14. The power conversion system of claim 12, wherein the rectifier switch control module further determines when the duration that the DC bus voltage is greater than the first voltage threshold is longer than a first time interval, the DC bus voltage threshold is set to be the first voltage threshold; and
determines when the duration that the DC bus voltage is less than the first voltage threshold is longer than a second time interval, the DC bus voltage threshold is set to be the second voltage threshold, which is higher than the first voltage threshold.

15. The power conversion system of claim 12, wherein the rectifier switch control module further determines when the duration that an output active power of the inverter is less than a power threshold value is longer than a first time interval, the DC bus voltage threshold is set to be the first voltage threshold; and
determines when the duration that the output active power is greater than or equal to the power threshold value is longer than a second time interval, the DC bus voltage threshold is set to be the second voltage threshold, which is higher than the first voltage threshold.

16. The power conversion system of claim 9, wherein the DC bus voltage threshold is obtained from the given DC bus voltage multiplied by a limiting coefficient $k_{limit}$, wherein a value range of $k_{limit}$ is $1 < k_{limit} < k_{limitmax}$, where $k_{limitmax}$ is a bus voltage protection coefficient corresponding to an overvoltage protection value of the DC bus voltage.

17. A voltage adjusting method applied to a voltage-adjusting device in a power conversion system, the power conversion system comprising a Vienna rectifier, a DC bus, and an inverter, the Vienna rectifier converting a three-phase AC voltage of a grid to a DC bus voltage, the inverter being electrically coupled to the DC bus and generating a three-phase AC signal based on the DC bus voltage transmitted by the DC bus, the voltage adjusting method comprising:

sampling a grid voltage by a grid voltage sampling module electrically coupled to the grid;

calculating a given DC bus voltage based the grid voltage by a given bus voltage calculation module;

receiving the DC bus voltage and the given DC bus voltage, and outputting an active current given signal based on the DC bus voltage and the given DC bus voltage by a voltage-adjusting module;

receiving a three-phase AC current from the grid, the active current given signal and the reactive current given signal, and outputting a three-phase control voltage by a current control module electrically coupled to the voltage-adjusting module;

receiving the DC bus voltage and comparing it with a DC bus voltage threshold, and outputting a switch control signal according to a comparison result by a rectifier swich control module; and receiving the three-phase control voltage, the DC bus voltage and the switch control signal to output a pulse control signal to the Vienna rectifier by a pulse width modulation module.

18. The voltage adjusting method of claim 17, wherein the given DC bus voltage is k times a peak value of grid line voltage, and k is between 1.0 and 1.2.

19. The voltage adjusting method of claim 17, further comprising:

sampling the DC bus voltage by a bus voltage sampling module electrically coupled to the DC bus.

20. The voltage adjusting method of claim 17, wherein the DC bus voltage threshold is a first voltage threshold when the voltage-adjusting device works in empty load or light load operation, and the DC bus voltage threshold is a second voltage threshold when the voltage-adjusting device is in overload operation, wherein the first voltage threshold is smaller than the second voltage threshold.

21. The voltage adjusting method of claim 20, wherein the first voltage threshold is obtained from the given DC bus voltage multiplied by a first limiting coefficient $k_{limit1}$, the second voltage threshold is obtained from the given DC bus voltage multiplied by a second limiting coefficient $k_{limit2}$, wherein a value range of $k_{limit1}$ and $k_{limit2}$ is $1 < k_{limit1} < k_{limit2} < k_{limitmax}$, where $k_{limitmax}$ is a bus voltage protection coefficient corresponding to an overvoltage protection value of the DC bus voltage.

22. The voltage adjusting method of claim 20, further comprising:

determining when the duration that the DC bus voltage is greater than the first voltage threshold is longer than a first time interval by the rectifier switch control module, the DC bus voltage threshold is set to be the first voltage threshold; and determining when the duration that the DC bus voltage is less than the first voltage threshold is longer than a second time interval, the DC bus voltage threshold is set to be the second voltage threshold, which is higher than the first voltage threshold.

23. The voltage adjusting method of claim 20, further comprising:

determining when the duration that an output active power of the inverter is less than a power threshold value is longer than a first time interval, the DC bus voltage threshold is set to be the first voltage threshold; and determining when the duration that the output active power is greater than or equal to the power threshold value is longer than a second time interval, the DC bus voltage threshold is set to be the second voltage threshold, which is higher than the first voltage threshold.

24. The voltage adjusting method of claim 17, wherein the DC bus voltage threshold is obtained from the given DC bus voltage multiplied by a limiting coefficient $k_{limit}$, wherein a value range of $k_{limit}$ is $1 < k_{limit} < k_{limitmax}$, where $k_{limitmax}$ is a bus voltage protection coefficient corresponding to an overvoltage protection value of the DC bus voltage.

* * * * *